United States Patent
Jalowka et al.

(10) Patent No.: US 10,786,954 B2
(45) Date of Patent: Sep. 29, 2020

(54) IN-SITU PRESSURE ENHANCED PROCESSING OF COMPOSITE ARTICLES

(71) Applicant: UNITED TECHNOLOGIES CORPORATION, Hartford, CT (US)

(72) Inventors: Joseph Jalowka, Broad Brook, CT (US); Peter Finnigan, Higganum, CT (US); Cristal Chan, Coventry, CT (US)

(73) Assignee: Raytheon Technologies Corporation, Farmington, CT (US)

(*) Notice: Subject to any disclaimer, the term of this patent is extended or adjusted under 35 U.S.C. 154(b) by 506 days.

(21) Appl. No.: 14/936,791

(22) Filed: Nov. 10, 2015

(65) Prior Publication Data

US 2016/0059497 A1 Mar. 3, 2016

Related U.S. Application Data

(63) Continuation of application No. 13/666,471, filed on Nov. 1, 2012, now abandoned.

(51) Int. Cl.
| | |
|---|---|
| *B29C 70/36* | (2006.01) |
| *B29C 70/48* | (2006.01) |
| *B29C 70/34* | (2006.01) |
| *F04D 29/52* | (2006.01) |
| *F04D 29/02* | (2006.01) |

(Continued)

(52) U.S. Cl.
CPC ............ *B29C 70/347* (2013.01); *B29C 45/02* (2013.01); *B29C 70/36* (2013.01); *B29C 70/446* (2013.01); *F02C 7/04* (2013.01); *F04D 29/023* (2013.01); *F04D 29/526* (2013.01); *B29K 2063/00* (2013.01); *B29K 2307/04* (2013.01); *B29K 2313/00* (2013.01); *B29K 2995/0037* (2013.01); *B29L 2031/7504* (2013.01); *F01D 5/005* (2013.01); *F05D 2300/20* (2013.01); *F05D 2300/43* (2013.01); *F05D 2300/603* (2013.01);

(Continued)

(58) Field of Classification Search
None
See application file for complete search history.

(56) References Cited

U.S. PATENT DOCUMENTS

| | | | | |
|---|---|---|---|---|
| 3,480,498 | A | * | 11/1969 | Paul, Jr. ............... B29C 53/56 118/50 |
| 4,348,247 | A | | 9/1982 | Loyd et al. |

(Continued)

FOREIGN PATENT DOCUMENTS

| | | |
|---|---|---|
| EP | 2290197 A2 | 3/2011 |
| WO | 2008149079 A2 | 12/2008 |

(Continued)

OTHER PUBLICATIONS

Supplementary Partial European Search Report for European Application No. 13851645.5.

(Continued)

*Primary Examiner* — Jeffry H Aftergut
(74) *Attorney, Agent, or Firm* — Carlson, Gaskey & Olds, P.C.

(57) ABSTRACT

A method for making a composite article comprises securing a layup over a form. The layup including a plurality of dry intermediate reinforcement plies wrapped around an inner reinforcement ply. Resin is infused into the layup under vacuum. The resin-infused layup is consolidated under pressure and cured.

18 Claims, 3 Drawing Sheets

(51) Int. Cl.
*F02C 7/04* (2006.01)
*B29C 70/44* (2006.01)
*B29C 45/02* (2006.01)
B29L 31/00 (2006.01)
F01D 5/00 (2006.01)
B29K 63/00 (2006.01)
B29K 307/04 (2006.01)

(52) U.S. Cl.
CPC ....... *F05D 2300/702* (2013.01); *Y02T 50/672* (2013.01); *Y10T 156/10* (2015.01)

(56) References Cited

U.S. PATENT DOCUMENTS

| | | | |
|---|---|---|---|
| 4,622,091 A | 11/1986 | Letterman | |
| 4,725,334 A | 2/1988 | Brimm | |
| 5,261,980 A * | 11/1993 | Pearce | B29C 33/76 156/169 |
| 5,266,139 A | 11/1993 | Yokota et al. | |
| 5,408,826 A | 4/1995 | Stewart et al. | |
| 5,698,055 A * | 12/1997 | Benkoczy | B29C 70/446 156/149 |
| 5,783,279 A | 7/1998 | Edgson et al. | |
| 5,976,662 A | 11/1999 | Pollard et al. | |
| 6,151,743 A * | 11/2000 | Church | B29C 53/585 14/73 |
| 6,354,334 B1 | 3/2002 | Ellyin et al. | |
| 6,814,541 B2 | 11/2004 | Evans et al. | |
| 6,913,436 B2 | 7/2005 | McMillan et al. | |
| 7,246,990 B2 | 7/2007 | Xie et al. | |
| 7,390,161 B2 | 6/2008 | Xie et al. | |
| 7,431,978 B2 | 10/2008 | Blanton et al. | |
| 7,605,223 B1 * | 10/2009 | Lincoln | C08G 73/1007 528/340 |
| 7,967,248 B2 | 6/2011 | Halme et al. | |
| 7,972,698 B2 | 7/2011 | Miller et al. | |
| 8,021,102 B2 | 9/2011 | Xie et al. | |
| 8,029,263 B1 | 10/2011 | Quenneville et al. | |
| 8,333,558 B2 * | 12/2012 | Finn | F01D 21/045 415/200 |
| 8,419,883 B2 | 4/2013 | Day et al. | |
| 8,657,990 B2 | 2/2014 | Tsotsis | |
| 9,017,814 B2 | 4/2015 | Xie et al. | |
| 2001/0002609 A1 | 6/2001 | Dagher et al. | |
| 2002/0022422 A1 | 2/2002 | Waldrop, III et al. | |
| 2002/0167119 A1 | 11/2002 | Hemphill | |
| 2003/0104156 A1 * | 6/2003 | Osada | B29C 70/44 428/40.1 |
| 2003/0186038 A1 | 10/2003 | Ashton et al. | |
| 2007/0132142 A1 | 6/2007 | Voegeli | |
| 2007/0272346 A1 * | 11/2007 | Shpik | B29C 53/566 156/171 |
| 2008/0127584 A1 | 6/2008 | Schiffmann et al. | |
| 2008/0286564 A1 | 11/2008 | Tsotsis | |
| 2009/0098337 A1 * | 4/2009 | Xie | B29C 70/202 428/121 |
| 2009/0120562 A1 | 5/2009 | Tsotsis et al. | |
| 2009/0151142 A1 * | 6/2009 | Xie | B29C 73/04 29/402.11 |
| 2009/0151860 A1 | 6/2009 | Carter et al. | |
| 2009/0155044 A1 * | 6/2009 | Xie | B29C 70/086 415/9 |
| 2009/0155065 A1 * | 6/2009 | Xie | F01D 11/122 415/200 |
| 2010/0077721 A1 | 4/2010 | Marshall | |
| 2010/0124654 A1 * | 5/2010 | Smith | B29C 43/3642 428/317.9 |
| 2011/0052383 A1 | 3/2011 | Lussier | |
| 2012/0231107 A1 | 9/2012 | Waldrop et al. | |
| 2012/0305172 A1 | 12/2012 | Maheshwari et al. | |
| 2012/0325398 A1 * | 12/2012 | Silcock | B29C 70/386 156/176 |
| 2013/0134621 A1 | 5/2013 | Tsotsis et al. | |

FOREIGN PATENT DOCUMENTS

| | | |
|---|---|---|
| WO | 2012046021 A1 | 4/2012 |
| WO | 2012049478 A1 | 4/2012 |
| WO | 2012076875 A1 | 6/2012 |

OTHER PUBLICATIONS

Chia, Elvin S.M. et al., "3-D Braided/RTM Composites: Smart RTM Fabrication & Compression Study," Society of Manufacturing Engineers Technical Paper, 2003, TP03PUB374.

Hess, Joseph P., "Braided Composite Structures," Society of Manufacturing Engineers Technical Paper, 1988, EM88-548.

International Search Report dated Dec. 26, 2013 for International Application No. PCT/US2013/067495.

Supplementary European Search Report for European Application No. 13851645.5 completed Mar. 23, 2016.

* cited by examiner

IN-SITU PRESSURE ENHANCED PROCESSING OF COMPOSITE ARTICLES

BACKGROUND

The described subject relates generally to composite materials and more specifically to methods for making composite materials with high fiber volume.

Composite materials are increasingly used in a variety of applications. They typically include a reinforcement structure retained within a solidified matrix. Existing production processes such as Vacuum-assisted Resin Transfer Molding (VaRTM) require extraordinary process control and other steps to repeatably produce composite articles with high fiber volume suitable for widespread aerospace use.

SUMMARY

A method for making a composite article comprises securing a layup over a form. The layup includes a plurality of dry intermediate reinforcement plies wrapped around an inner reinforcement ply. Resin is infused into the layup under vacuum. The resin-infused layup is consolidated under pressure and cured.

A method for making a composite article comprises securing an inner reinforcement ply over a form to define an inner surface of the article. A plurality of dry intermediate reinforcement plies are wrapped under tension over the inner reinforcement ply. Resin is infused into the reinforcement plies under vacuum to form a resin-infused layup. The resin-infused layup is consolidated under pressure and cured.

DETAILED DESCRIPTION

Figure 1:
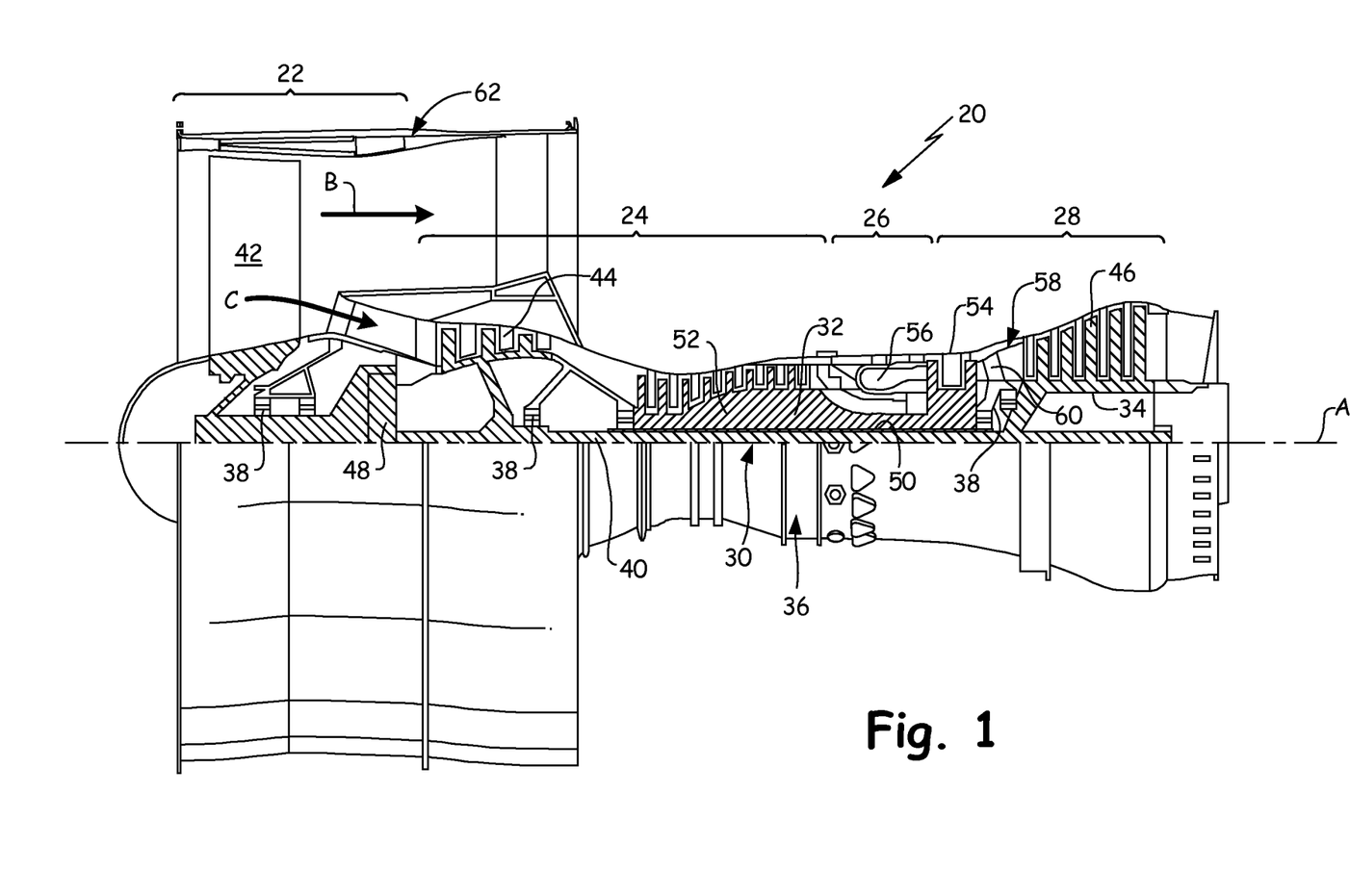
FIG. 1 schematically illustrates an example gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan directly, or via a gearbox, an intermediate spool that enables an intermediate pressure turbine to drive an intermediate compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 directly, or through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is an industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Fan section 22 can be surrounded by fan containment case 62, including a ballistic surface to absorb impacts from one or more fugitive fan blades in a blade-off condition, which may occur due to foreign object damage (FOD) event.

Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2A:
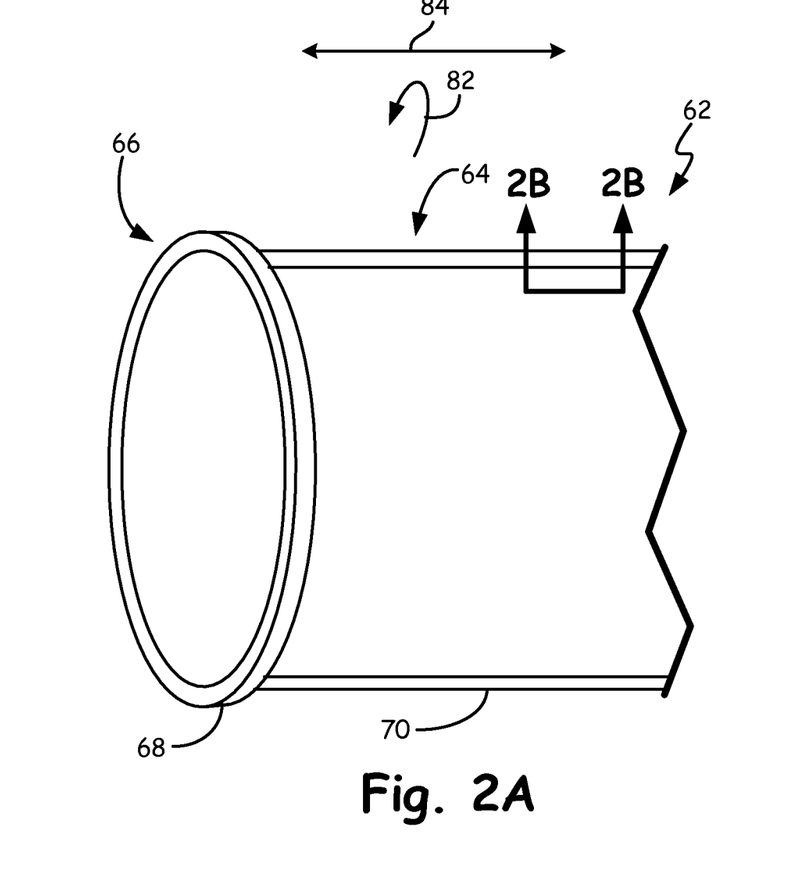
FIG. 2A depicts an example composite component for a gas turbine engine.
Figure 2B:
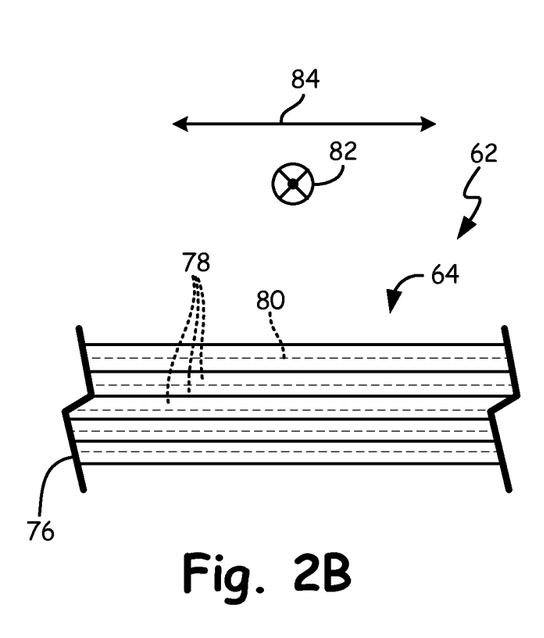
FIG. 2B shows a cross-section of a portion of the example composite component taken through line 2B-2B in FIG. 2A.

FIG. 2A shows an axial end portion of fan containment case 62, and FIG. 2B shows a cross-section of case 62 taken through line 2B-2B of FIG. 2A. FIGS. 2A and 2B also include body section 64, flange section 66, flange section outer diameter 68, wraps 70, reinforcement structure 72, inner reinforcement ply 76, a plurality of intermediate reinforcement plies 78, and outer reinforcement ply 80, component circumferential direction 82, and component axial direction 84.

Fan containment case 62 includes a generally cylindrical or frustoconical body section 64 with flange section 66. Flange section 66 may be formed integrally with body section 64 or may be added later for securing containment case 62 to axially adjacent parts of the engine. Flange section 66 can be upturned relative to body section 64 such that flange section outer diameter 68 is disposed radially outward from body section outer diameter 70. Alternatively, flange section outer diameter 68 can optionally be disposed radially inward from body section outer diameter 70 such that flange section 66 is downturned relative to body section 64.

In this example, case 62 has composite body section 64 with reinforcement structure 72 retained within a solidified matrix. The reinforcement structure 72 can include inner reinforcement ply 76, a plurality of intermediate reinforcement plies 78, and outer reinforcement ply 80. Reinforcement plies 76, 78, 80 are arranged to form a layup, which is then infused with a viscous uncured resin material, then consolidated and cured. For certain applications such as fan containment case 62, reinforcement plies 76, 78, 80 may be arranged with the lengths of the underlying fiber weaves or tows arranged generally along a component circumferential direction 82. This arrangement can increase hoop strength for larger components as compared to arranging the fiber lengths into a component axial direction 84. In this illustrative example, increased hoop strength allows a fan containment case to better absorb one or more lost fan blades or other debris with a minimum of deflection without impairing load bearing capabilities of the case during the remainder of the flight.

Non-limiting examples of suitable reinforcement plies 76, 78, 80 include unidirectional tape, woven (2D and 3D) fabrics, and braided fiber tows. Non-limiting examples of suitable fabric compositions include one or more of carbon, silicon carbide, fiberglass, aramid (Kevlar® or Nomex®), and glass. The fibers may be coated to improve adherence with the matrix, or they may remain uncoated if adherence is sufficient. Non-limiting examples of suitable resins for the matrix include thermoset resins such as epoxy, bismaleimide, and polyimide, or any other suitable material with appropriate mechanical characteristics. While several examples are given, it will be appreciated that the disclosed subject matter can be adapted to a wide variety of composite materials not explicitly named herein.

While fan containment case 62 is depicted as a generally cylindrical component, this is done merely for illustrative purposes. It will be appreciated that fan containment cases 62 can be adapted to have a multitude of structural features and modifications to selectively enhance operational performance. In one non-limiting example, certain portions of case 62 can be made thicker in the radial dimension around the location of the fan rotor. In certain other embodiments, fan containment case 62 can optionally be constructed with reinforcement structure 72 having multiple types of reinforcement materials, each with their own fabric composition. In one non-limiting example, a radially inner portion of reinforcement structure 72 (proximate inner ply 76) can have plies with a first fabric composition such as Kevlar®, while a radially outer portion (proximate outer ply 80) can have a second fabric composition such as carbon fiber. The case can then be formed by arranging plies to form an inner layup and an outer layup, then adding the matrix resin material and curing.

Several processes have been developed in an attempt to increase composite fiber volume (i.e., volume of the composite occupied by the reinforcement fibers as opposed to the matrix and voids). Traditional composite processes, such as standard Vacuum-assisted Resin Transfer Molding (VaRTM) processes, can reliably produce composites with fiber volume around 50% and a porosity of 5% or more. The standard VaRTM process relies on infusing dry fiber reinforcement plies by applying vacuum to draw resin through the plies. Once the preform is saturated with resin, the vacuum is removed and the resin is immediately cured.

Fan containment cases, and many other aerospace applications such as nacelles, wing panels, aircraft body panels, etc. require much higher fiber volumes of at least about 60% and porosity of less than about 2% in order to meet stringent requirements for strength, weight, and performance. Pre-impregnated (prepreg) fabrics have been used to achieve higher fiber volumes, but prepregs also introduce many storage, handling, and processing issues. They are subject to wrinkling particularly around the middle and outer plies of larger layups. Prepregs are also much more expensive and available only with limited combinations of reinforcement and matrix materials. These and other barriers have slowed the adoption of composites in aerospace applications despite their inherent weight and performance advantages over metals. Thus there is a need for a simple, flexible process that can provide increased fiber volumes and decreased porosity while allowing for broad choice in material selection and low cost.

Figure 3:
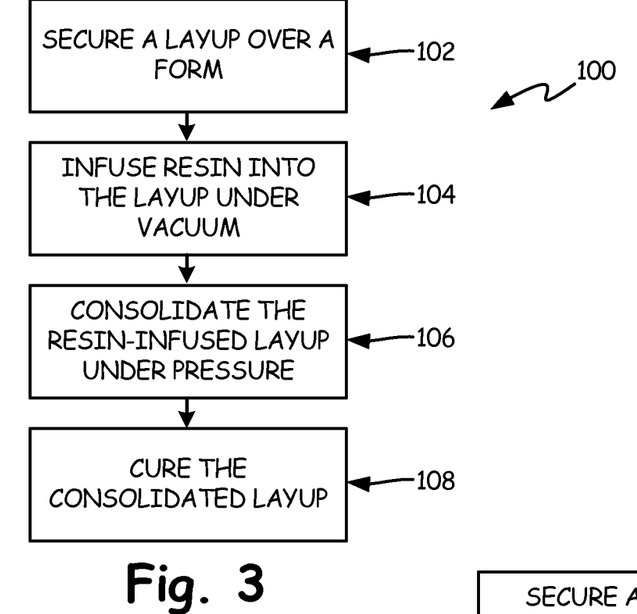
FIG. 3 is flow chart showing an example method of making a composite component.

FIG. 3 shows a flow chart of a method 100 for making a composite article, such as fan containment case 62. Step 102 includes securing a layup over a form. The layup can have a near-net shape relative to the composite article. The form may be cylindrical, frustoconical, or other shape having a generally circular cross-section, but need not necessarily be of a constant thickness. For a composite fan containment case, the layup may be arranged to provide additional and/or alternative reinforcement geometry radially around the expected axial alignment of the fan rotor.

An inner surface of the layup can be tacked or otherwise adhesively bonded to the form. The form may be a tool, mandrel, or the like which can maintain an inner surface of the article. In the example of a fan containment case, the inner surface is the surface facing the fan and which first receives any fan blade debris in a blade-out event. The layup can have a plurality of dry reinforcement plies including intermediate plies 78 and outer plies 80, such as those described with reference to FIGS. 2A and 2B. Non-limiting examples of fabric compositions for dry reinforcement plies include one or more of carbon, silicon carbide, fiberglass, aramid (Kevlar® or Nomex®), and glass. As noted above, the fibers may be coated to improve adherence with the matrix, or they may be uncoated.

Certain embodiments of step 102 include securing a first layup portion over the form, and securing a second layup portion over the first layup portion. FIGS. 2A and 2B were described with reference to certain embodiments of case 62 where reinforcement structure 72 includes more than one fabric composition. In those embodiments, the first layup portion has a first fabric composition (e.g., Kevlar®), and the second layup portion has a second fabric composition (e.g., carbon fiber). In certain embodiments, the second layup portion is secured after securing the first layup portion. In alternative embodiments, the second layup portion is secured over the first layup portion prior to securing the first layup portion to the form. It will also be recognized that in certain embodiments, the layup can include more than two layup portions. In certain of those embodiments, the layup is provided with radially alternating first and second layup portions.

At step 104, resin is infused into the dry reinforcement plies under vacuum. The resin can include a thermoset polymer. Non-limiting examples include epoxy, bismaleimide, and polyimide. In embodiments of step 104, resin can be drawn into the layup in various ways. For this step, the layup can be sealed for example in a vacuum bag or other suitable container. The layup can optionally include flow distribution media (e.g., netting or mesh) around the outer ply to help improve the permeability of resin into the intermediate and inner plies. To further enhance resin transfer, the infusing step can be performed with a longitudinal axis of the layup and the form arranged in a substantially vertical orientation. In one example, the infusing step is performed at an applied temperature measuring between about 150° F. (about 65° C.) and about 250° F. (about 121° C.).

Step 106 includes consolidating the resin-infused layup under pressure, and at step 108, the resin-infused layup is cured to form a precursor to the composite article. The precursor may be in a near-net shape or may require further processing to achieve the final state. The pressure can be applied in step 106 to consolidate the layup until it reaches the target fiber volume, which may be at least about 60%. The temperature around the resin-infused layup can be modified to adjust the resin viscosity to a level that is higher than typical for infusion but is still low enough to allow the plies to be consolidated under pressure. In one example, the infusing step can be performed at a first infusion temperature, and the consolidation step performed at a first consolidation temperature, the first consolidation temperature greater than the first infusion temperature. In other examples, infusion step 104 and/or consolidation step 106 can additionally be performed at respective second infusion and consolidation temperatures.

Embodiments of this process can utilize the low cost of dry reinforcements and bulk resin typical of a VaRTM process, while increasing fiber volumes to levels typically reserved for pre-impregnated materials (prepregs). While the VaRTM process utilizes vacuum to help pull resin into the layup, vacuum alone does not supply enough force to fully consolidate resin into the reinforcement plies, nor can vacuum remove all of the air or other volatile matter that might be trapped in the layup. Applying external pressure to the resin-infused layup after removal of the vacuum further compacts the material to draw out additional resin and gas pockets which are allowed to escape, thereby increasing fiber density and decreasing porosity as compared to the results of a standard VaRTM process.

Another shortcoming of using prepregs, in addition to the storage and handling issues that come with maintaining a composite in the partially cured state until it is ready for use, is their tendency to wrinkle or gather when being applied to the case-forming tool. In contrast, dry reinforcement plies can be wrapped in tension during formation of the layup which helps it to achieve near-net thickness of the case prior to infusion, consolidation, and curing. Therefore, unlike prepregs, embodiments of the described process can be adapted to virtually any compatible combination of reinforcement and matrix materials.

Figure 4:
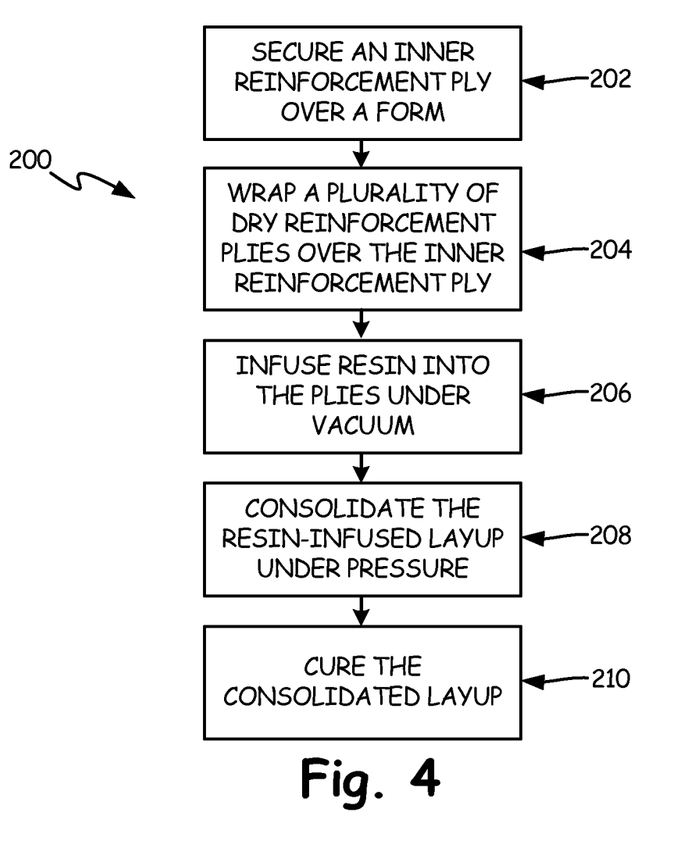
FIG. 4 is a flow chart showing an alternative example embodiment of a method for making a composite component

FIG. 4 shows the steps of method 200, an alternative embodiment of method 100 whereby the layup as well as the finished article are made as part of a single process.

Step 202 includes securing an inner reinforcement ply over a form defining an inner diameter of the article. As noted above with reference to FIG. 3, the inner reinforcement ply can be tacked or otherwise adhesively bonded to the form to define and maintain an inner diameter surface of the article. The inner reinforcement ply can be a dry reinforcement ply that is tackified with a catalyzed or uncatalyzed adhesive so that the layup will remain secured to the form during the remaining steps. The adhesive should be compatible with the matrix resin referenced in step 206. In certain alternative embodiments, the inner reinforcement can be a prepreg while the remainder of the reinforcement plies of step 204 are dry. Using a prepreg only for the inner layer allows the layup to remain secured to the form without the need for a separate tackifier. Whether the inner reinforcement ply is tackified, or a prepreg, the fabric composition can be the same as or different from the fabric composition(s) of intermediate reinforcement plies referenced in step 204 below.

Step 204 describes wrapping a plurality of dry intermediate reinforcement plies under tension over the inner ply. The inner reinforcement ply and the plurality of dry intermediate reinforcement plies define a layup with one or more fabric compositions. The intermediate plies can be individually wrapped or can be provided as a contiguous sheet. The reinforcement plies can be any dry ply material having suitable matrix compatibility and mechanical properties. Non-limiting examples of fabric compositions (coated or uncoated) include one or more of carbon, silicon carbide, fiberglass, aramid (Kevlar® or Nomex®), and glass.

As described above with reference to FIG. 3, a layup can include more than one layup portion, each with a different fabric composition. Thus, the plurality of dry reinforcement plies referenced in step 204 can optionally have more than one fabric composition. In this example, a first (e.g., radially inner) layup portion can be formed by wrapping an inner reinforcement ply over a form according to step 202, then wrapping at least one of the plurality of dry reinforcement plies referenced in step 204. These dry reinforcement plies have a first fabric composition such as Kevlar®. A second (e.g., radially outer) layup portion can then be formed by wrapping at least one of the dry reinforcement plies (referenced in step 204) which has a second fabric composition such as carbon fiber. It will be appreciated that the dry reinforcement plies can include any suitable combination of fiber compositions, and are wrapped around the preceding dry reinforcement plies accordingly.

Regardless of the number of layup portions used in a particular embodiment, a final outer ply can be held to the intermediate plies, for example, using a film adhesive which can be tacked to the reinforcement with localized heating. This holds the layup together until it can be infused with resin as described below.

At step 206, resin can be infused under vacuum into the plurality of reinforcement plies to form a resin-infused layup. By way of non-limiting example, the matrix resin can be a thermoset polymer such as epoxy, bismaleimide, and polyimide. For this step, the layup can be sealed for example in a vacuum bag or other suitable container from which most of the air may be evacuated, and the resin infused radially into the layup. As described above, the layup can optionally include flow distribution media (e.g., netting or mesh) around the outer ply. To further enhance resin transfer, the infusing step can be performed with a longitudinal axis of the layup and the form arranged in a substantially vertical orientation.

Next, step 208 has the resin-infused layup consolidated under pressure before being cured at step 210 to form a composite article. The consolidation step can be performed at an applied pressure measuring between about 100 psig (about 690 kPa) and about 150 psig (about 1030 kPa). The temperature around the resin-infused layup can be modified to adjust the resin viscosity to a level that is higher than typical for infusion but is still low enough to allow the plies to be consolidated under pressure. After curing, the article may be further processed into the final shape, such as composite fan containment case 62 (shown in FIG. 2A). At least one of consolidation step 208 and curing step 210 can be performed with a longitudinal axis of the layup and the form arranged in a substantially horizontal orientation. The finished fan containment case can have a fiber volume of at least about 60%.

Following is one non-limiting example implementation of method 200. An inner reinforcement ply of woven 24K carbon fabric is tacked to a cylindrical forming tool with a catalyzed epoxy resin. A plurality of dry 24K carbon fabric plies are wrapped in tension around the inner ply, with an outer carbon fabric ply secured via heat-activated epoxy film to complete the layup. The layup is placed in a vacuum bag, and the vacuum-bagged layup is arranged into an autoclave or similar vessel such that the longitudinal direction of the containment duct is vertical. Epoxy resin is infused into a lower end of the vessel and is drawn circumferentially inward and upward through the layup. By infusing the case vertically, any entrapped air and volatile components are allowed to be displaced vertically into a vacuum trap. After infusion is complete, denoted by resin appearing in the outlet line, the resin inlet and outlet can be closed off. In one example, the infusing step is performed at a first infusion temperature of about 200° F. (about 94° C.), and the consolidation step is performed at a first consolidation temperature of about 250° F. (about 121° C.).

After infusion, the infused layup can be rotated so that its longitudinal direction is now horizontal. External pressure of about 125 psig (about 860 kPa) is applied, and the resin outlet from the bag is opened. Opening of the bag allows additional residual resin or entrapped gas to escape. Temperature is then increased to the curing temperature of about 350° F. (about 175° C.) to cure the consolidated layup into the composite article. The curing step can also be performed with the longitudinal axis maintained in a horizontal orientation to provide a more uniform temperature distribution around the diameter of the article.

In certain embodiments, the autoclave or other vessel can be placed on a rotatable fixture mounted to the floor or to a cart. The composite article may thus be processed in an optimal orientation for each step without unnecessary movement or disturbance of the composite.

The subject matter has been described with reference to an example embodiment of a fan containment case for a gas turbine engine. It will be recognized, for example, that any number of composite articles can take the place of the fan containment case, and that steps of the example process described above can be readily adapted to a variety of composite articles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present disclosure.

A method for making a composite article comprises securing a layup over a form. Resin is infused into the layup under vacuum, consolidated under pressure, and cured.

The method of the preceding paragraph can optionally include, additionally and/or alternatively, any one or more of the following features, configurations and/or additional components:

A method for making a composite article according to an exemplary embodiment of this disclosure, among other possible things, includes securing a layup over a form. The layup includes a plurality of dry intermediate reinforcement plies wrapped around an inner reinforcement ply. Resin is infused into the layup under vacuum. The resin-infused layup is consolidated under pressure and cured.

A further embodiment of the foregoing method, wherein the plurality of dry intermediate reinforcement plies are wrapped in tension.

A further embodiment of any of the foregoing methods, wherein each of the plurality of dry intermediate reinforcement plies includes a fabric composition selected from one or more of: carbon, fiberglass, silicon carbide, aramid, and glass.

A further embodiment of any of the foregoing methods, wherein a fabric composition of the inner reinforcement ply is the same as a fabric composition of at least one of the plurality of dry intermediate reinforcement plies.

A further embodiment of any of the foregoing methods, wherein the securing step includes adhesively bonding the inner reinforcement ply to the form.

A further embodiment of any of the foregoing methods, wherein the inner reinforcement ply comprises a pre-impregnated fabric.

A further embodiment of any of the foregoing methods, wherein the infusing step is performed with a longitudinal axis of the layup and the form arranged in a substantially vertical orientation.

A further embodiment of any of the foregoing methods, wherein at least one of the consolidation step and the curing step is performed with a longitudinal axis of the layup and the form arranged in a substantially horizontal orientation.

A further embodiment of any of the foregoing methods, wherein the consolidation step is performed at an applied pressure measuring between about 100 psig (about 690 kPa) and about 150 psig (about 1030 kPa).

A further embodiment of any of the foregoing methods, wherein the resin comprises a thermoset polymer resin.

A further embodiment of any of the foregoing methods, wherein the infusing step is performed at a first infusion temperature, and the consolidation step is performed at a first consolidation temperature, the first consolidation temperature greater than the first infusion temperature.

A composite article made according to any of the foregoing methods, wherein the article is a finished fan containment case having a fiber volume of at least about 60%.

A method for making a composite article comprises securing an inner reinforcement ply over a form and wrapping plies around the inner reinforcement ply. Resin is infused into the layup under vacuum, consolidated under pressure, and cured.

The method of the preceding paragraph can optionally include, additionally and/or alternatively, any one or more of the following features, configurations and/or additional components:

A method for making a composite article according to an exemplary embodiment of this disclosure, among other possible things, includes securing an inner reinforcement ply over a form to define an inner surface of the article. A plurality of dry intermediate reinforcement plies are wrapped under tension over the inner reinforcement ply. Resin is infused into the reinforcement plies under vacuum to form a resin-infused layup. The resin-infused layup is consolidated under pressure and cured.

A further embodiment of the foregoing method, wherein the inner reinforcement ply is adhesively bonded to the tool.

A further embodiment of any of the foregoing methods, wherein a fabric composition of the inner reinforcement ply is the same as a fabric composition of at least one of the plurality of dry intermediate reinforcement plies.

A further embodiment of any of the foregoing methods, wherein the plurality of dry reinforcement plies includes a fabric composition selected from one of: carbon, fiberglass, silicon carbide, aramid, and glass.

A further embodiment of any of the foregoing methods, wherein the resin comprises a thermoset polymer selected from the group consisting of: an epoxy resin, a bismaleimide resin, and a polyimide resin.

A further embodiment of any of the foregoing methods, wherein at least one of the consolidation step and the curing step is performed with a longitudinal axis of the resin-infused layup in a horizontal orientation.

A further embodiment of any of the foregoing methods, wherein the consolidation step is performed at an applied pressure measuring between about 100 psig (about 690 kPa) and about 150 psig (about 1030 kPa).

A composite fan containment case made according to any of the foregoing methods.

The invention claimed is:

1. A method for making a composite article, the method comprising:
   securing a layup over a form, the layup including a plurality of dry intermediate reinforcement plies wrapped around a dry inner reinforcement ply, wherein the dry inner reinforcement ply is a different material than the dry intermediate reinforcement plies and the layup is secured to the form prior to infusion of resin and each of the dry intermediate reinforcement plies and the dry inner reinforcement ply comprise a woven fabric;
   wrapping an outer reinforcement ply about a radially outermost one of the dry intermediate reinforcement plies, wherein the outer reinforcement ply is a carbon fabric ply secured to the radially outer most one of the dry intermediate reinforcement plies with a heat activated epoxy film;
   infusing resin into the layup and the outer reinforcement ply under vacuum;
   consolidating the resin-infused layup and the outer reinforcement ply under pressure after removal of the vacuum; and
   curing the consolidated layup and the outer reinforcement ply.

2. The method of claim 1, wherein the plurality of dry intermediate reinforcement plies are wrapped in tension.

3. The method of claim 1, wherein each of the plurality of dry intermediate reinforcement plies includes a fabric composition selected from one or more of: carbon, fiberglass, silicon carbide, aramid, and glass.

4. The method of claim 1, wherein the securing step includes adhesively bonding the inner reinforcement ply to the form.

5. The method of claim 1, wherein the infusing step is performed with a longitudinal axis of the layup and the form arranged in a substantially vertical orientation.

6. The method of claim 5, wherein at least one of the consolidation step and the curing step is performed with a longitudinal axis of the layup and the form arranged in a substantially horizontal orientation.

7. The method of claim 1, wherein the consolidation step is performed at an applied pressure measuring between about 100 psig (about 690 kPa) and about 150 psig (about 1030 kPa).

8. The method of claim 1, wherein the resin comprises a thermoset polymer resin.

9. The method of claim 1, wherein the infusing step is performed at a first infusion temperature, and the consolidation step is performed at a first consolidation temperature, the first consolidation temperature greater than the first infusion temperature.

10. The method of claim 1, wherein the composite article is a finished fan containment case having a fiber volume of at least about 60%.

11. A method for making a composite article, the method comprising:
   securing a dry inner reinforcement ply over a form to define an inner surface of the article, wherein the dry inner reinforcement ply is adhesively bonded to the form prior to infusion of resin;
   wrapping a plurality of dry intermediate reinforcement plies under tension over the inner reinforcement ply, wherein each of the dry inner reinforcement ply and the dry intermediate reinforcement plies comprise a woven fabric of a different material;
   wrapping an outer reinforcement ply about a radially outermost one of the plurality of dry intermediate reinforcement plies, wherein the outer reinforcement ply is a carbon fabric ply secured to the radially outer most one of the plurality of dry intermediate reinforcement plies with a heat activated epoxy film;
   vacuum infusing resin into the dry inner reinforcement plies, the plurality of dry intermediate reinforcement plies and the outer reinforcement ply to form a resin-infused layup;
   consolidating the resin-infused layup under pressure after removal of the vacuum; and
   curing the consolidated layup.

12. The method of claim 11, wherein the plurality of dry reinforcement plies includes a fabric composition selected from one of: carbon, fiberglass, silicon carbide, aramid, and glass.

13. The method of claim 11, wherein the resin comprises a thermoset polymer selected from the group consisting of: an epoxy resin, a bismaleimide resin, and a polyimide resin.

14. The method of claim 11, wherein at least one of the consolidation step and the curing step is performed with a longitudinal axis of the resin-infused layup in a horizontal orientation.

15. The method of claim 11, wherein the consolidation step is performed at an applied pressure measuring between about 100 psig (about 690 kPa) and about 150 psig (about 1030 kPa).

16. A method for making a composite article, the method comprising:
   securing a layup over a form, the layup including a plurality of dry intermediate reinforcement plies wrapped around a dry inner reinforcement ply, wherein the layup is secured to the form prior to infusion of resin without an application of resin and the dry intermediate reinforcement plies comprise a woven fabric and the dry inner reinforcement ply comprises a woven fabric of a different material from the woven fabric of the dry intermediate reinforcement plies;
   wrapping an outer reinforcement ply about a radially outermost one of the plurality of dry intermediate reinforcement plies, wherein the outer reinforcement ply is a carbon fabric ply secured to the radially outer most one of the dry intermediate reinforcement plies with a heat activated epoxy film;
   infusing resin into the layup and the outer reinforcement ply under vacuum at a first infusion temperature;
   consolidating the resin-infused layup and the outer reinforcement ply under pressure after removal of the vacuum at a first consolidation temperature until the layup and the outer reinforcement ply reaches a fiber volume of at least about 60%; and
   curing the consolidated layup at a curing temperature; wherein
   the first consolidation temperature is greater than the first infusion temperature, but less than the curing temperature.

17. The method of claim 1, including wrapping the layup over the form such that a longitudinal length of fiber weaves within each of the plurality of dry intermediate reinforcement plies are arranged along a circumferential direction of the composite article.

18. The method as recited in claim 10, including forming a flange section as part of the fan containment case and a radial thickness of the containment case varies in an axial direction.

* * * * *